(12) United States Patent
Steen et al.

(10) Patent No.: US 7,357,753 B2
(45) Date of Patent: Apr. 15, 2008

(54) METHOD FOR REGULATING THE ROTATIONAL SPEED OF A CLUTCH-INDEPENDENT POWER TAKE-OFF

(75) Inventors: Marcus Steen, Angered (SE); Sixten Berglund, Torslanda (SE); Anders Eriksson, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 272 days.

(21) Appl. No.: 11/308,286

(22) Filed: Mar. 15, 2006

(65) Prior Publication Data

US 2006/0183599 A1 Aug. 17, 2006

Related U.S. Application Data

(63) Continuation of application No. PCT/SE2004/001359, filed on Sep. 21, 2004.

(30) Foreign Application Priority Data

Sep. 24, 2003 (SE) .................................. 0302544

(51) Int. Cl.
*F16D 48/06* (2006.01)
(52) U.S. Cl. ........................................ 477/73
(58) Field of Classification Search ............... 477/73, 477/107, 111
See application file for complete search history.

(56) References Cited

U.S. PATENT DOCUMENTS 5,522,778 A 6/1996 Iwase et al.
5,971,888 A * 10/1999 Goode ......................... 477/107
6,607,466 B2 * 8/2003 Bordini ........................ 477/3
7,252,623 B2 * 8/2007 Meyer et al. ............... 477/176
2003/0119625 A1 6/2003 Bordini

FOREIGN PATENT DOCUMENTS

EP 1147936 10/2001
GB 2272542 5/1994

OTHER PUBLICATIONS

International Search Report for corresponding application PCT/SE2004/001359.

* cited by examiner

Primary Examiner—Dirk Wright
(74) Attorney, Agent, or Firm—WRB-IP LLP

(57) ABSTRACT

Method for regulating the rotational speed of a clutch-independent power take-off. The power take-off is driven by an engine arranged in a vehicle. The engine is connected to an automatic stagegeared transmission by way of an automated vehicle clutch. At least one control unit is provided for controlling the transmission, the vehicle clutch and the engine. The control unit controls the rotational speed of the engine as a function of the position of the throttle lever and controls the transmission as a function of the position of a gear selector. The rotational speed of the engine is regulated by way of a control and the degree of engagement of the vehicle clutch is regulated by way of the throttle lever when the power take-off is engaged and a drive position is selected by way of the gear selector. The rotational speed of the engine is automatically reduced when equipment engaged to the power take-off approaches a limit position.

18 Claims, 2 Drawing Sheets

METHOD FOR REGULATING THE ROTATIONAL SPEED OF A CLUTCH-INDEPENDENT POWER TAKE-OFF

BACKGROUND AND SUMMARY

The present application is a continuation of International Application No. PCT/SE2004/001359, filed Sep. 21, 2004, which claims priority to SE 0302544-2, filed Sep. 24, 2003, both of which are hereby incorporated by reference.

The present invention relates to a method for regulation of the rotational speed of a clutch-independent power take-off arranged on a motor vehicle engine and driven by the vehicle engine. The invention also relates to a computer program or computer program product for said method.

In order to be able to handle the load on a truck efficiently, load-handling equipment is required. The most common examples of such equipment are tipping devices and cranes. Load changers, refuse handling units, rotary cement mixers, flushing units and air compressors for loading and discharging bulk loads are also commonly encountered.

In order to use the drive power of the vehicle engine to also drive the load handling equipment, a power take-off is required. The drive power from the power take-off can be transmitted either mechanically via a prop shaft or belts, or hydraulically by fitting a hydraulic pump to the power take-off.

Power take-offs are divided into clutch-independent and clutch-dependent power take-offs. The speed and power output of the clutch-independent power take-offs follow the vehicle engine irrespective of whether the vehicle is being driven or is stationary. Clutch-independent power take-offs are suitable for load handling equipment that is used when the vehicle is being driven, such as refuse handling units, cement mixers, cooling/freezer units and snow plows. The clutch-independent power take-offs can be fitted to the engine of the vehicle or fitted between the vehicle engine and transmission, but in front, that is to say on the engine side, of the plate clutch arranged between the engine and the transmission. EP 1147936 and GB 2272542 show examples of vehicles equipped with clutch-independent power take-offs.

Automatic transmissions of the automated stagegeared transmission type have become ever more common in heavier vehicles with the increasing development of microprocessor systems, making it possible, with a control computer and a number of control devices, such as servomotors, for example, to precisely regulate the engine speed, engagement and disengagement of an automated plate clutch between engine and transmission, and transmission internal clutch members in relation to one another, so that smooth gear changes are always achieved at the correct engine speed.

The advantage with this type of automatic transmission compared to a conventional automatic transmission made up of planetary gear trains and having a hydrodynamic torque converter on the inlet side lies partly in the fact that it is simpler and more robust and can be manufactured at substantially lower cost than the conventional automatic transmission, especially where used in heavy vehicles, and partly in that it affords greater efficiency, which means scope for reduced fuel consumption.

According to the prior art relating to vehicles equipped with said type of automated stagegeared transmission and coupling-independent power take-off, several operations are required in order to control both the output speed of the vehicle internal combustion engine, which determines the rotational speed of the power take-off, and an automated clutch (usually vehicles without clutch pedal).

There may even be restrictions on the driver performing certain maneuvers. When tipping a tipper body, for example, which is preferably done by means of a hydraulic arrangement connected to the clutch-independent power take-off, a relatively high speed on the output shaft of the power take-off is often required in order to perform more rapid maneuvers, i. e. to tip material speedily.

According to the prior art, this is most readily achieved by the driver depressing the accelerator pedal to the required degree. The transmission is then in neutral.

It is not uncommon, however, for the driver to also move the vehicle slightly forwards or backwards whilst the tipper body is being tipped. This would require the engagement of a gear in the gearbox, and for the vehicle to be driven forwards or backwards at low speed in a controlled manner, although this is not compatible, in this situation, with the high rotational speed of the engine. With the prior art, therefore, that is to say with a vehicle equipped with clutch-independent power take-off, automated stagegeared transmission and automated clutch, it is not possible to perform a maneuver as described above satisfactorily.

U.S. Pat. No. 5,522,778 shows an example of the prior art and a vehicle equipped with automated stagegeared transmission and power take-off.

There is therefore a need, in a vehicle equipped with clutch-independent power take-off and automated stagegeared transmission, to be able to drive the vehicle forwards or backwards independently of any simultaneous regulation of the rotational speed of the power take-off.

A method according to an aspect of the invention describes a method for regulating the rotational speed of a clutch-independent power take-off, the power take-off being driven by an engine arranged in a vehicle. The engine is connected to a transmission by way of an automated vehicle clutch. At least one control unit is arranged in the vehicle for controlling the vehicle clutch and the engine, the control unit controlling the rotational speed of the engine as a function of the position of a first control. The invention is characterized in that the rotational speed of the engine is regulated by way of a second control and the degree of engagement of the vehicle clutch is regulated by way of the first control when the power take-off is connected up and a drive position is selected by way of the gear selector.

An advantage of the method according to an aspect of the invention is that the driver of the vehicle can regulate the rotational speed of the power take-off whilst being able to drive the vehicle forwards or backwards. When a gear is selected by way of the gear lever and the power take-off is engaged, the driver of the vehicle can regulate the speed of the power take-off by way of the second control and can regulate the movement of the vehicle by way of the first control. The first control may take the form, for example, of the vehicle's throttle lever, such as an accelerator pedal arranged in the vehicle.

According to an aspect of the method according to the invention, the second control comprises a cruise control unit arranged in the vehicle. The normal function of the cruise control unit is to control the vehicle speed limiter. According to the invention, the cruise control unit assumes a further function when the power take-off is engaged and the gear lever is in a drive position. The advantage is that one control is used for multiple functions. In a second preferred embodiment of the method according to the invention, the second control comprises a control arranged in the vehicle for controlling/regulating equipment engaged to the power take-off. In a further embodiment of the method according to the invention, the rotational speed of the power take-off is regulated by way of a further separate control.

In a further aspect of the method according to the invention, the rotational speed of the engine and hence of the power take-off is automatically reduced when equipment coupled up to the power take-off approaches its limit position. The speed reduction may be successive from a point at which there is a certain calculated time remaining to the limit position.

An advantage of this aspect is that the impact and jerk that can occur when the equipment driven by the power take-off reaches a limit position is minimized. Wearing of the equipment and the drive unit is reduced.

BRIEF DESCRIPTION OF THE DRAWINGS

The present invention will be described in more detail below with reference to drawings attached, which by way of-example show further preferred embodiments of the invention and background to the invention.

DETAILED DESCRIPTION

Figure 1A:
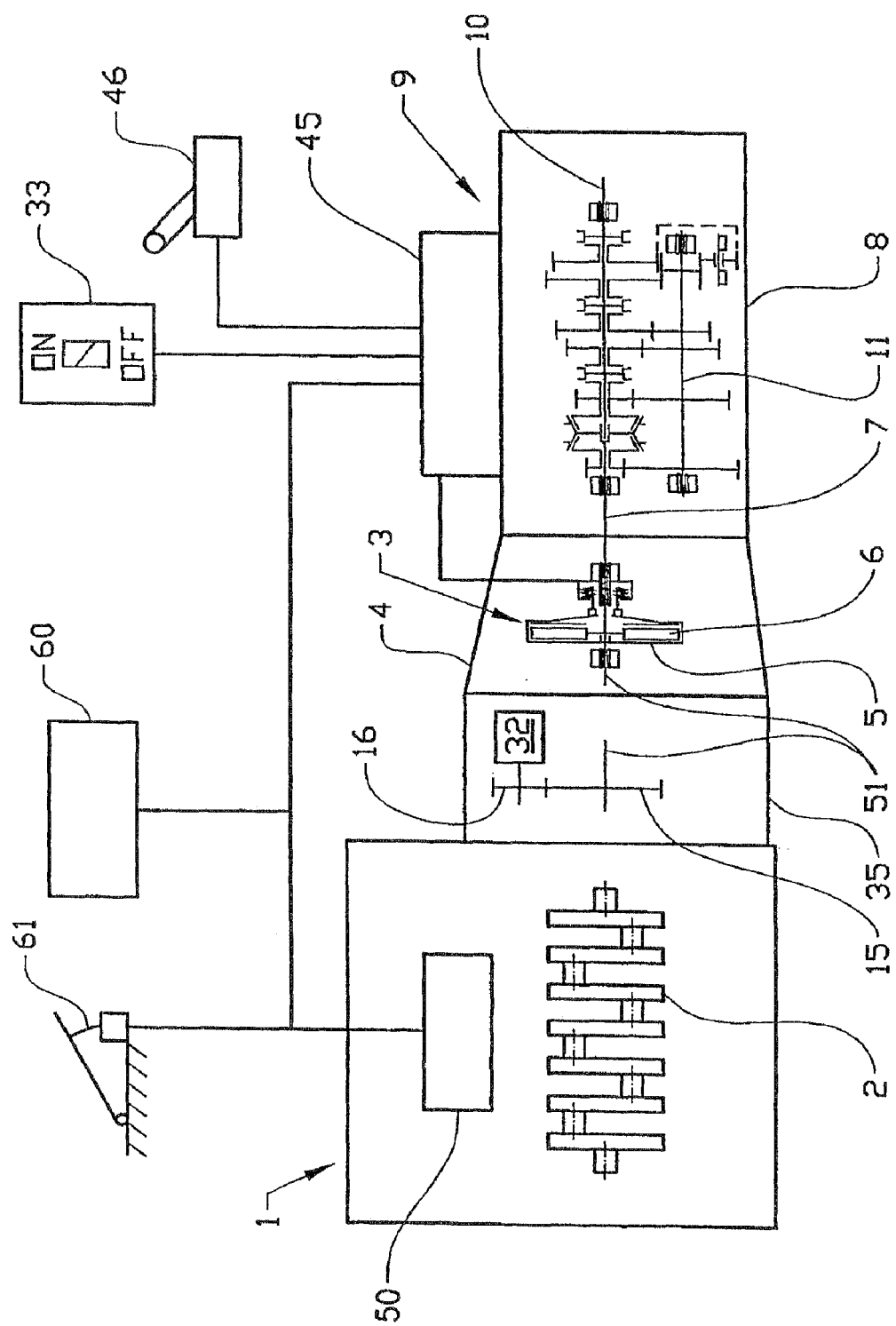
FIG. 1a shows a schematic representation of an internal combustion engine with connecting power take-off, plate clutch and transmission.

In FIG. 1a, 1 denotes a six-cylinder internal combustion engine, for example a diesel engine, the crankshaft 2 of which is coupled to a single dry-plate clutch, generally denoted by 3, which is enclosed in a clutch cover 4. The crankshaft 2 is connected rotationally locked by way of the engine output shaft 51, which is connected to the flywheel (not shown), to the clutch housing 5 of the clutch 3, while the plate 6 thereof is connected and rotationally locked to an input shaft 7, which is rotatably supported in the housing 8 of a transmission generally denoted by 9. A main shaft 10 and an intermediate shaft 11 are also rotatably supported in the housing 8. An intermediate housing 35 with a toothed gear 15 fixed on the output shaft 51 is arranged between the engine 1 and the clutch cover 4. This toothed gear 15, via another toothed gear 16, drives a shaft which forms an input shaft to a power take-off denoted by 32.

Figure 1B:
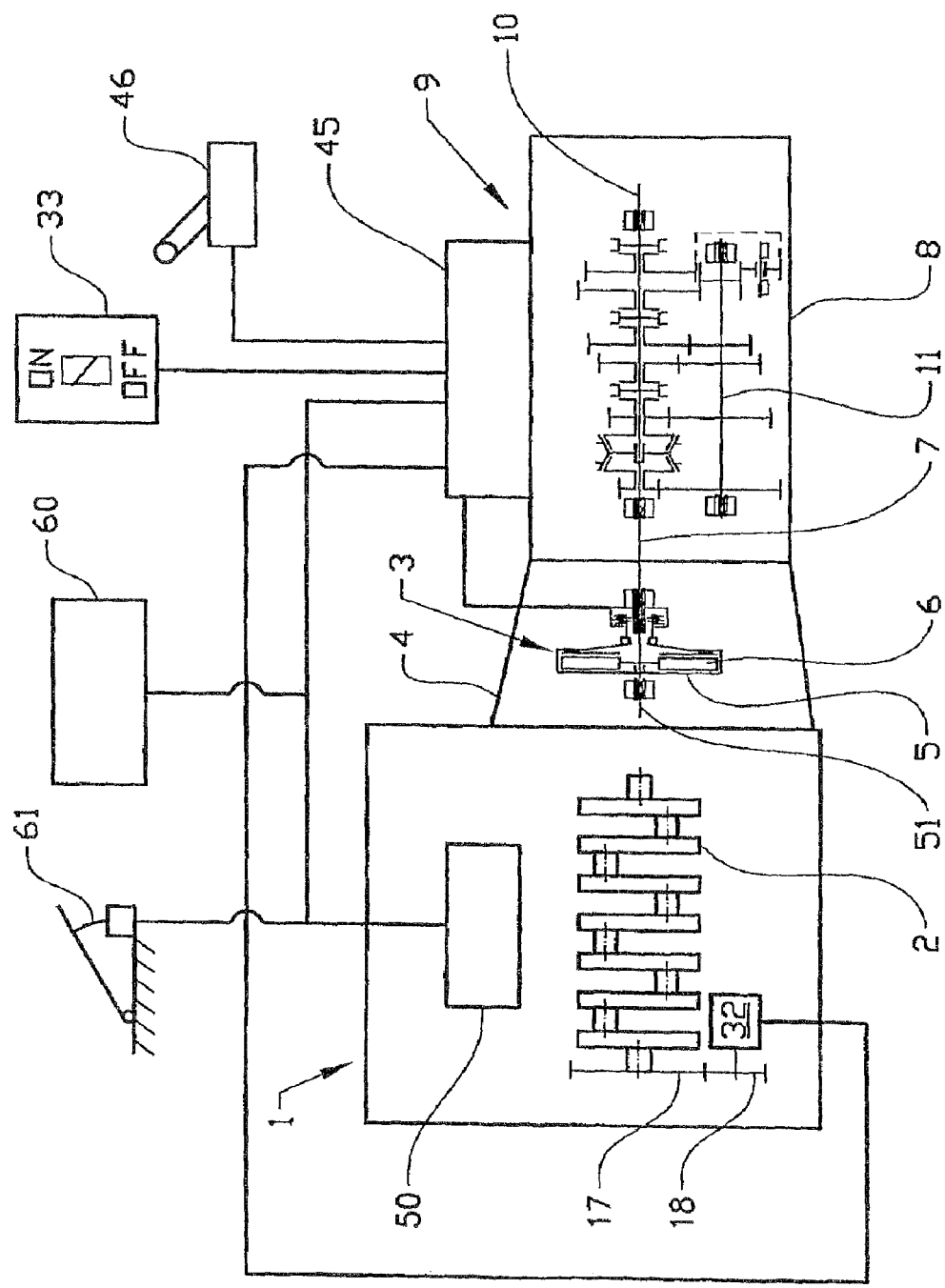
FIG. 1b shows a schematic representation of an internal combustion engine with connecting plate clutch and transmission, together with a power take-off arranged directly on the internal combustion engine.

FIG. 1b shows an alternative embodiment which corresponds to the embodiment shown in FIG. 1a, except that there is no intermediate housing 35 with toothed gear and that the power take-off 32 is instead driven by the geared transmission, here denoted by 17 or 18, of the engine 1.

A stagegeared transmission 9 is usually constructed from an input shaft 7, an intermediate shaft 11, which has at least one toothed gear meshing with a toothed gear on the input shaft 7, and main shaft 10 with toothed gears, which mesh with toothed gears on the intermediate shaft 11. The main shaft 10 is then further connected to an output shaft coupled to the driving wheels by way of a prop shaft, for example. Each pair of toothed gears has a different gear ratio from another pair of gears in the transmission. Different transmission ratios are obtained in that different pairs of gears transmit the torque from the engine 1 to the driving wheels.

Servo devices (not shown), which may be pneumatically actuated piston-cylinder arrangements of the type used in a transmission of the type described above and which are marketed under the designation I-Shift, are arranged in the transmission 9.

The servo devices are controlled by an electronic control unit 45 comprising a microprocessor, as a function of signals fed into the control unit and representing various engine and vehicle data covering at least the engine speed, vehicle speed, throttle lever (usually accelerator pedal) position and, where applicable, engine brake on/off, when an electronic gear selector 46 coupled to the control unit 45 is in its automatic shift position. When the selector is in the position for manual shifting, gear shifting is performed at the driver's command via the gear selector 46. The control unit 45 selects the transmission ratio by means of the servo devices. The transmission goes into the neutral position when the neutral position is selected with the gear selector. The other positions of the gear selector such as said automatic shift position and the manual shift position are in this application referred to as drive position. With the gear selector in drive position, the driver of the vehicle can get the vehicle to move forwards and backwards by operating a throttle lever.

The control unit 45 obtains the engine speed and/or engine torque from the engine control unit 50, which controls the fuel injection.

The power take-off 32 itself most commonly comprises a housing mounted on the intermediate housing 35 or alternatively on the engine block. By means of an engaging and disengaging arrangement (not shown), the input shaft of the power take-off can be connected and rotationally locked either to the output shaft 51 of the engine 1 as in the embodiment according to FIG. 1a or to the crankshaft 2 as in the embodiment according to FIG. 1b. In both embodiments, the engaging and disengaging arrangement of the power take-off is controlled by the control unit 45. The driver of the vehicle seeks to engage or disengage the power take-off 32 by means of a engagement/disengagement control 33, which is connected up to the control unit 45. When the power take-off 32 is engaged, it is therefore driven by the engine 1. The rotational speed of the power take-off 32 follows the rotational speed of the engine 1. The power take-off 32 may be equipped with one or more possible transmission ratios on at least one output shaft (not shown) of the power take-off 32. The required unit that is to be driven is coupled to the output shaft of the power take-off 32. According to a first embodiment of the invention, the control unit 45 is programmed so that, when the control unit 45 receives an input signal from the engagement/disengagement control 33 indicating that the power take-off 32 is engaged and that the gear selector 46 is in a drive position, the control unit 45 controls the rotational speed of the engine 1 and thereby of the power take-off 32 through input signals from a cruise control unit 60 arranged in the vehicle. At the same time, the control unit 45 ensures that the degree of engagement of the plate clutch 3 is controlled via the vehicle throttle lever 61. The magnitude of the torque transmitted to the driving wheels is therefore determined by regulating the degree of engagement of the plate clutch. The engine speed is affected very little by the position of the throttle lever, since normally the torque take-up from the engine to the driving wheels (via the plate clutch) is relatively low. In this way, the driver of the vehicle can regulate the rotational speed of the power take-off 32 whilst driving the vehicle forwards or backwards.

In a second advantageous embodiment of the invention, the rotational speed of the power take-off 32 is regulated by a separate control arranged in the vehicle for controlling the rotational speed of the power take-off 32. In the figures, the separate control is denoted by the same reference number, that is to say 60. The rotational speed of the power take-off can be controlled either via the cruise control unit or the separate control, or by both.

If the power take-off 32 is engaged and the neutral position is selected by the gear selector 46, the driver regulates the rotational speed of the power take-off 32 in the known way through the throttle lever 61 or the cruise control unit 60 or the separate control 60 for controlling the rotational speed of the power take-off 32, if the vehicle is equipped with such a separate control. In the neutral position, the engine 1 is incapable of driving the vehicle forwards or backwards.

According to an advantageous embodiment of the invention, the rotational speed of the internal combustion engine 1 and thereby that of the power take-off 32 is reduced when equipment engaged to the power take-off 32 approaches a limit position. If, for example, the tipping arrangement for a tipper body arranged on the vehicle is driven by a clutch-independent power take-off and the tipper body, for example, is approaching its maximum raised position, the control unit 45 is programmed such that, when the control unit 45 receives an input signal indicating that the limit position will be reached within a certain predetermined time interval, the control unit 45 begins to reduce the engine speed. The engine speed can be successively reduced to a rotational speed which is expected to produce minimal impact and jerking of the tipper body when the limit position is finally reached.

In yet another embodiment of the invention, the driver of the vehicle may advantageously be provided with feedback from the engagement/disengagement function of the power take-off in the form of a pilot light and/or information on a display, or by some other information device connected to the vehicle.

The transmission 9 may be automatic, automated (as in the exemplary embodiment shown) or manual, or it may be provided with a fixed transmission ratio.

The engine 1 may be some other type of drive source, such as an electric motor, a hydraulic motor or a hybrid combining an electric motor with an internal combustion engine, for example.

The vehicle clutch may be of the plate type (as in the exemplary embodiment shown), a cone, drum, hydrodynamic or electromagnetic clutch. Common to all of these is the fact that they are controllable.

The throttle lever may be an accelerator pedal or another type of throttle lever in which the driver of the vehicle can directly control and regulate the rotational speed of the internal combustion engine.

The control units 45 and 50 may be arranged in some way other than that shown in the exemplary embodiment.

Alternatively, one control unit may perform all constituent functions of the invention, or the constituent functions of the invention may be divided between and performed by more than two control units in the vehicle.

The method of control according to the invention can be performed in that a computer program is executed in a data processor arranged in the control unit 45.

A computer program according to the invention comprises a program code enabling an arrangement integrated into a vehicle installation to control the engine 1, the transmission 9, the plate clutch 3 and the power take-off 32 in a predefined manner when the program is executed by a processor integrated into or coupled to the installation.

The computer program according to the invention may be stored on a medium that can be read by a computer system integrated into the arrangement. This medium may take the form, for example, of a data diskette, a memory module, a CD or the like. This may be advantageous, for example, when the program is to be downloaded into the vehicle during manufacture and/or when the program in the vehicle is to be updated. Software may be updated, for example, at fixed service intervals or, if so desirable, directly by a customer. Software can also be updated via a connection to the internet, for example, to a server where the program is stored.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention must not be regarded as being limited to the exemplary embodiments described above, a number of other variants and modifications being feasible without departing from the scope of the following claims.

What is claimed is:

1. A method for regulating rotational speed of a clutch-independent power take-off, the power take-off being driven by an engine arranged in a vehicle and the engine being connected to a transmission by way of an automated vehicle clutch, at least one control unit being arranged in the vehicle for controlling the vehicle clutch and the engine, comprising:
    controlling the rotational speed of the engine with the control unit as a function of a position of a first control,
    regulating the rotational speed of the engine by way of a second control; and
    regulating a degree of engagement of the vehicle clutch by way of the first control when the power take-off is engaged and a drive position is selected by way of a gear selector.

2. The method as claimed in claim 1, wherein the rotational speed of the engine is automatically reduced when equipment engaged to the power take-off approaches a limit position.

3. The method as claimed in claim 2, wherein the rotational speed is successively reduced when there is a certain calculated time remaining to the limit position.

4. The method as claimed in claim 1, wherein the first control comprises a throttle lever arranged in the vehicle.

5. The method as claimed in claim 4, wherein the rotational speed of the engine is automatically reduced when equipment engaged to the power take-off approaches a limit position.

6. The method as claimed in claim 5, wherein the rotational speed is successively reduced when there is a certain calculated time remaining to the limit position.

7. The method as claimed in claim 1, wherein the second control comprises a cruise control unit arranged in the vehicle.

8. The method as claimed in claim 7, wherein the rotational speed of the engine is automatically reduced when equipment engaged to the power take-off approaches a limit position.

9. The method as claimed in claim 8, wherein the rotational speed is successively reduced when there is a certain calculated time remaining to the limit position.

10. The method as claimed in claim 1, wherein the second control comprises a control arranged in the vehicle for controlling or regulating equipment engaged to the power take-off.

11. The method as claimed in claim 10, wherein the rotational speed of the engine is automatically reduced when equipment engaged to the power take-off approaches a limit position.

12. The method as claimed in claim 11, wherein the rotational speed is successively reduced when there is a certain calculated time remaining to the limit position.

13. The method as claimed in claim 1, wherein the second control comprises a separate control arranged in the vehicle for regulating the rotational speed of the power take-off.

14. The method as claimed in claim 13, wherein the rotational speed of the engine is automatically reduced when equipment engaged to the power take-off approaches a limit position.

15. The method as claimed in claim 14, wherein the rotational speed is successively reduced when there is a certain calculated time remaining to the limit position.

16. A computer program executable on a computer for use in conjunction with a method for regulating rotational speed of a clutch-independent power take-off, the power take-off being driven by an engine arranged in a vehicle and the engine being connected to a transmission by way of an automated vehicle clutch, at least one control unit being arranged in the vehicle for controlling the vehicle clutch and the engine, the program comprising program code for performing the steps of:

controlling the rotational speed of the engine with the control unit as a function of a position of a first control, regulating the rotational speed of the engine by way of a second control; and regulating a degree of engagement of the vehicle clutch by way of the first control when the power take-off is engaged and a drive position is selected by way of a gear selector.

17. A computer program product comprising the computer program comprising program code as set forth in claim 16, the computer program product being stored on a computer-readable medium.

18. A computer program product as set forth in claim 16, wherein the computer program product is adapted to be loaded directly into an internal memory of a computer.

* * * * *